Dec. 27, 1938.    W. S. TAYLOR    2,141,421
FOLDING CLEAT OR GROUSER
Filed Feb. 23, 1937    2 Sheets-Sheet 1
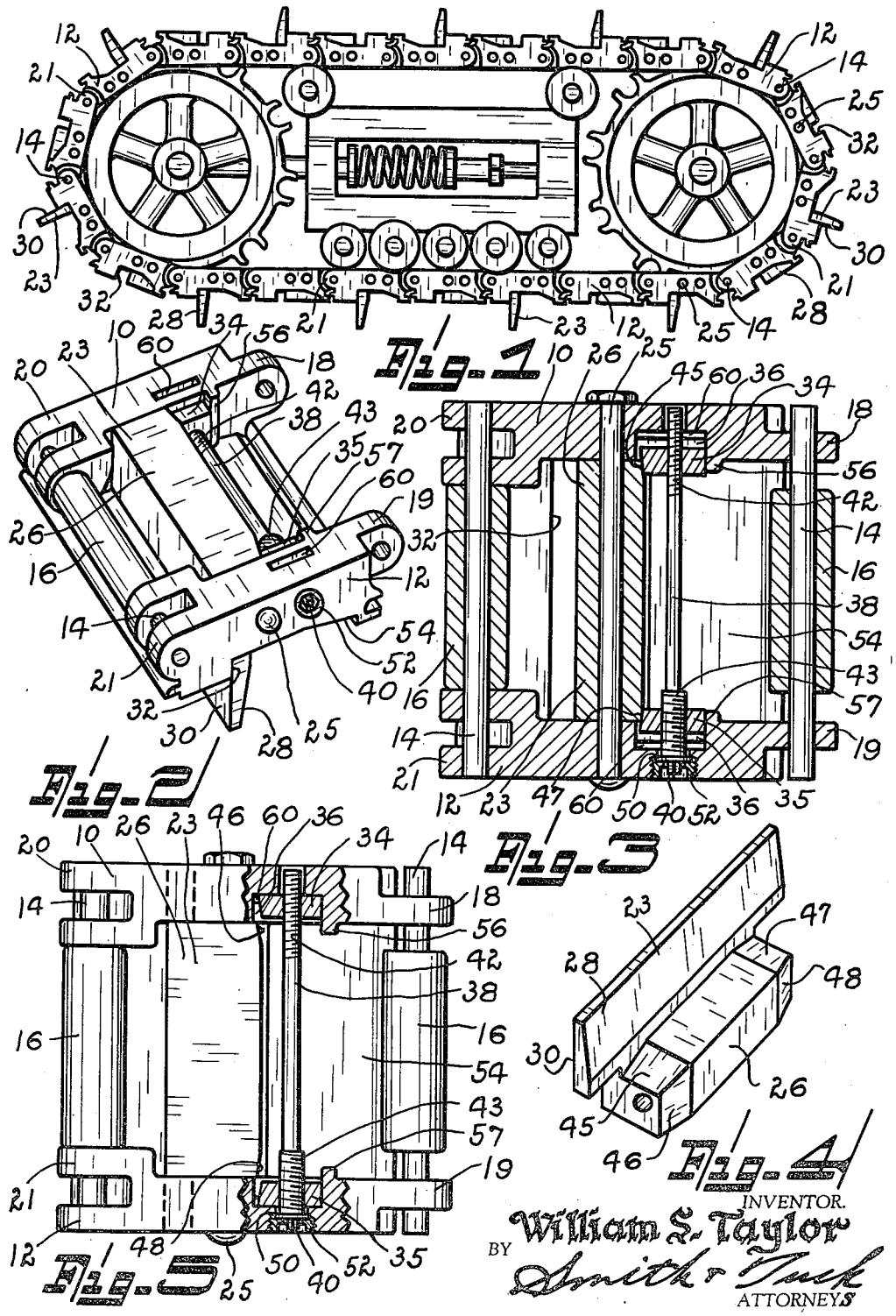
INVENTOR.
William S. Taylor
BY Smith & Tuck
ATTORNEYS Dec. 27, 1938.　　　W. S. TAYLOR　　　2,141,421
FOLDING CLEAT OR GROUSER
Filed Feb. 23, 1937　　　2 Sheets-Sheet 2
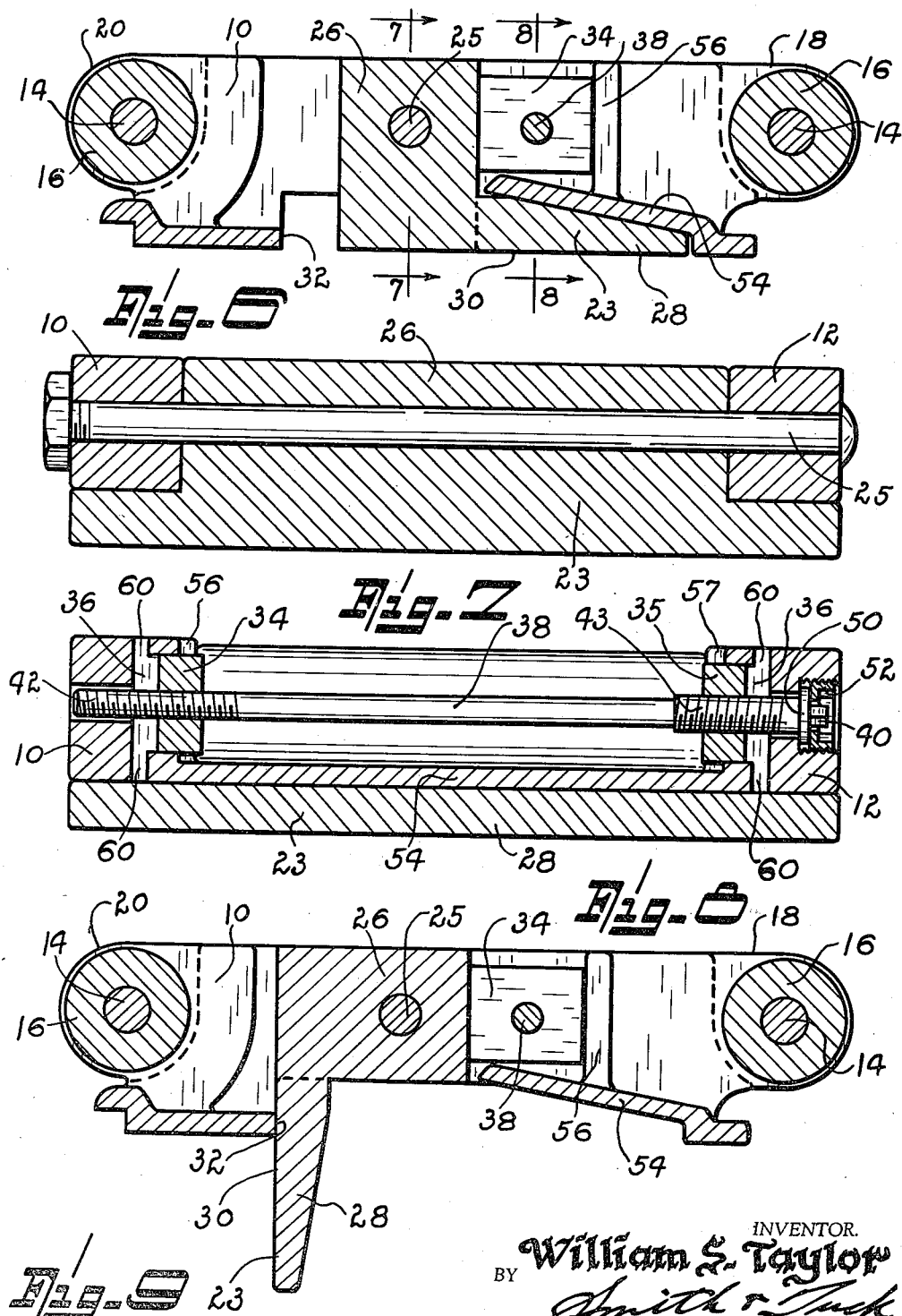
INVENTOR.
William S. Taylor
BY
ATTORNEYS Patented Dec. 27, 1938

2,141,421

UNITED STATES PATENT OFFICE 2,141,421

FOLDING CLEAT OR GROUSER

William S. Taylor, Seattle, Wash.

Application February 23, 1937, Serial No. 127,111

5 Claims. (Cl. 305—10)

My present invention relates to the art of track laying devices of either the crawler or wheel type and more particularly to a foldable grouser for tractors.

The general prevalence of improved highways has created an urgent demand for a traction device for tractors which can be easily changed from operative to inoperative positions or vice versa with a minimum wastage of time. For use in soft ground it is essential that the average tractor be provided with grousers that will bite into the ground and thereby greatly increase the traction of the machine. When, however, it is desirable to transport the tractors over improved highways it has been found that the average grouser is apt to seriously damage hard surface roads and even actually destroy the surface of improved roads, to such an extent that it has been found necessary to pass legislation to prevent the use of grousers on public highways in many districts. As a tractor must of necessity be transported about to places of intended use there is a real need for a grouser that is so arranged that it can be quickly brought into use or folded out of use so that the tread will be smooth and will not injure highways.

My present invention is believed to fulfill this purpose and many other purposes such as use on military vehicles and the like where the saving in time may be of great value.

The principal object of my present invention, therefore, is to provide a foldable grouser for track laying tractors of either the crawler type or the type using wheels upon which tread blocks are pivotally mounted.

A further object of my present invention is to provide means for quickly bringing my grouser into use or if the same is being used to quickly put it out of use, and provide a smooth tread.

Another important object of my invention is to provide locking means which will positively secure my grouser in either its extended or folded position.

A still further object of my invention is to provide a foldable grouser which is not pivoted upon the pin holding the successive links together.

Other and more specific objects will be apparent from the following description taken in connection with the accompanying drawings, wherein Figure 1 is a side elevation of a crawler tractor tread employing tread blocks using my grouser, the left hand side of the figure, as viewed, being the front of the tread.

Figure 2 is a perspective view showing a tread block, with my grouser shown in its operating position.

Figure 3 is a typical longitudinal sectional view in plan through my device.

Figure 4 is a perspective view showing my grouser proper.

Figure 5 is a view taken in the same sense as Figure 3, with certain parts broken away to better illustrate the construction, the locking members being shown in their retracted position as distinguished from Figure 3.

Figure 6 is a vertical sectional view taken longitudinally through the center of a tractor tread block using my device.

Figures 7 and 8 are cross sectional views taken along lines 7—7 and 8—8 respectively of Figure 6.

Figure 9 is a sectional view in elevation taken in the same sense as Figure 6 but showing my grouser in its operating position as distinguished from Figure 6, which shows the same in its folded position.

Referring to the drawings, throughout which like reference characters indicate like parts, 10 and 12 designate respectively the opposite side bars forming the side frames of a tractor block of a type used on crawler tractors. Disposed between bars 10 and 12 are link pins 14 and sprocket engaging rollers 16. Suitable link connecting lugs are provided as the male lugs 18 and 19 and the female lugs at 20 and 21.

Disposed between side bars 10 and 12 and intermediate therein is my foldable grouser 23. This member is pivotally mounted upon the thru pin 25 and is so arranged that it may be moved from the position shown in Figure 6 to that shown in Figure 9 or vice versa. The grouser proper consists of a central body portion 26 of substantial cross-section through which pin 25 extends. It is provided with the outwardly extending grouser or cleat portion proper 28. This is preferably formed so that its leading face is a prolongation of the body 26 so as to provide a smooth bearing surface as is indicated in Figure 6 when the grouser is folded into its inoperative position.

When the grouser is in its extended position as indicated in Figure 9 the leading surface 30 abuts stop 32 which is formed, normally, as part of the tread block, or link assembly and serves as one of the ties that joins bars 10 and 12. This arrangement provides a very positive stop which is sufficiently far removed from pin 25 as to have adequate mechanical advantage so that it can be reasonably expected to stand unusual strain so often encountered in tractor work. While stop 32 provides a definite limit for the movement of the grouser while the tractor is travelling in its forward direction, it naturally would not hold the same if the tractor were to back up or if the grouser were to strike a hard substance such as a stone, for instance.

To provide definite locking means which will hold the grouser in the desired and definite position at all times, I have provided locking or wedging blocks 34 and 35. These are disposed for limited reciprocation within recesses 36 formed in the side bars; the movement and locking of these wedged blocks is provided by screw 38. This member is adapted to be revolved by any suitable wrench applied to the flattened or otherwise deformed head 40 and is provided with right and left hand thread as at 42 and 43, engaging respectively blocks 34 and 35. It will be apparent it is believed that as screw 38 is revolved blocks 34 and 35 will both be moved either toward the center or away from the center. When the blocks are moved away from the center into the bottom of their respective recesses 36, they do not hinder the rotation of the grouser but as they are moved outwardly by screw 38 they come into the path of the grouser as it is revolved and provide a lock therefore.

To provide secure locking of the grouser it may be desirable to provide the body portion 26 with two beveled faces at each end as 45, 46, 47, and 48. If also blocks 34 and 35 are formed with the same bevel on the side that engages body 26 a very powerful locking or wedging action is provided which also serves to limit the extreme movement of blocks 34 and 35 on screw 38. Attention is invited to the fact that ease of assembly indicates the desirability of making threads 43 on a diameter sufficiently larger than the threads 42 so that the latter may pass through nut 35 during the assembly of units. Further it will be observed that screw 38 is provided with a flange at 50 which in turn is held in position by the threaded bushing 52. In this manner screw 38 even though it revolves is prevented from having longitudinal movement. To provide additional backing for blocks 34 and 35 I prefer to form inwardly extending reinforcements at 56 and 57. These are preferably formed as part of side bars 10 and 12.

To provide a definite stop and rest for the cleat portion 28 of the grouser, when the grouser is in its folded position, I provide the rest member indicated at 54. This is preferably formed as part of the tread block assembly.

If dirt or the like becomes lodged in recesses 36 behind blocks 34 and 35, it can be removed by driving it out thru slots 60 by some suitable instrument.

*Method of operation*

In using my foldable grouser, assuming that the same is installed for instance on a tread-block, it is folded as indicated at Figure 6. When the tractor is taken on soft ground requiring the use of the grousers a wrench of the type usually referred to as speed wrenches, is applied to retainer nut 52 and the same is turned to release screw 38 so it may be turned; a socket wrench is then applied to head 40 and screw 38 is turned so as to bring blocks 34 and 35 well into their recesses 36. Then, manualy, the grouser is folded out into the position shown in Figure 9. When in position, screw 38 is then turned in the reverse direction moving blocks 34 and 35 in toward the center of the block thus providing a definite lock, as the beveled faces of blocks 34 and 35 engage in this instance the beveled faces 46 and 48 of the grouser. The reverse of the operation is effected in the same general manner with the blocks 34 and 35 engaging, respectively, the tapering faces 45 and 47. This same operation is performed with each block where it is desired to extend the grouser to its working position or to fold it and produce a flat tread block. In many cases it is necessary only to use a fraction of the total number of grousers and in order to save time a user might extend every third, fourth or fifth grouser, if that gave him sufficient traction for the purpose intended. In other cases it might be necessary to have every other grouser in operative position.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a tread block for tractors the combination with spaced side bars having link connecting pins at each end thereof, of a pivoted grouser disposed upon a separate pivot pin intermediate said link pins, said grouser being arranged to provide a smooth tread block when in its folded position and a downwardly extending grouser when in its extended position, locking means for said grouser consisting of lock blocks disposed in recesses on the inner side of said side bars, a common mounting screw for said lock blocks, having right and left hand threads adapted to engage respectively said lock blocks and means for locking said screw against rotation.

2. A traction block comprising spaced side bars and connecting links therefor, a cleat pivotally mounted in said side bars and having a body portion and an elongated extension, said body portion having beveled faces adjacent the ends thereof, means including a pair of laterally adjustable blocks adapted to engage said beveled faces for retaining said cleat in adjusted position, and means for locking said latter means.

3. A traction block comprising spaced side bars and connecting links therefor, a cleat pivotally mounted in said side bars and having a body portion and an elongated extension, said body portion having beveled faces adjacent the ends thereof, means including a bolt journaled in said side bars, a pair of blocks threadedly mounted on said bolt and adapted to engage said beveled faces, means for rotating said bolt to disengage said blocks from said faces, and means for locking the latter means in adjusted position.

4. A traction block comprising spaced side bars having notches in the ground engaging faces thereof, and connecting links therefor, a cleat pivotally mounted in said side bars and having a body portion and an elongated extension of greater width than said body portion, and the rear face thereof adapted to engage said notches to limit the movement of said cleat in one direction and the front face adapted to engage said side bars to limit movement in the opposite direction, said body portion having beveled faces adjacent the ends thereof, means including a pair of laterally adjustable blocks adapted to engage said beveled faces for retaining said cleat in adjusted position and means for locking said latter means.

5. A traction block comprising spaced side bars having notches in the ground engaging faces thereof and connecting links therefor, a cleat pivotally mounted in said side bars and having a body portion and an elongated extension of greater width than said body portion and the rear face thereof adapted to engage said notches to limit movement of said cleat in one direction and the front face adapted to engage said side bars to limit movement in the opposite direction, said body portion having beveled faces adjacent the ends thereof, means including a bolt journaled in said side bars, a pair of blocks threadedly mounted on said bolt and adapted to engage said beveled faces, means for rotating said bolt to disengage said blocks from said faces, and means for locking the latter means in adjusted position.

WILLIAM S. TAYLOR.